United States Patent
Haeri et al.

(10) Patent No.: US 6,529,894 B1
(45) Date of Patent: Mar. 4, 2003

(54) COMMUNICATING NETWORK INFORMATION USING UNIVERSAL RESOURCE LOCATORS

(75) Inventors: Arsalan Haeri, Newport Beach, CA (US); Eric D. Soneson, Lake Forest, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 10/124,510

(22) Filed: Apr. 16, 2002

Related U.S. Application Data

(62) Division of application No. 09/361,887, filed on May 21, 1999, now Pat. No. 6,385,615.

(51) Int. Cl.[7] ............................. G06F 17/30; G06F 7/00
(52) U.S. Cl. ................................................. 707/1
(58) Field of Search ............................ 707/10; 709/223

(56) References Cited

U.S. PATENT DOCUMENTS

| | | | | |
|---|---|---|---|---|
| 5,774,664 A | | 6/1998 | Hidary et al. | 395/200.48 |
| 5,905,872 A | | 5/1999 | DeSimone et al. | 395/200.75 |
| 5,996,010 A | * | 11/1999 | Leong et al. | 709/223 |
| 6,008,805 A | | 12/1999 | Land et al. | 345/335 |
| 6,026,445 A | | 2/2000 | Kephart et al. | 709/245 |
| 6,195,707 B1 | | 2/2001 | Minh | 709/245 |
| 6,240,464 B1 | | 5/2001 | Fijolek et al. | 709/250 |
| 6,286,040 B1 | | 9/2001 | Durham et al. | 709/221 |
| 6,301,618 B1 | | 10/2001 | Sitaraman et al. | 709/227 |
| 6,308,206 B1 | * | 10/2001 | Singh | 709/223 |
| 6,385,615 B1 | * | 5/2002 | Haeri et al. | 707/10 |
| 6,393,475 B1 | * | 5/2002 | Leong et al. | 709/223 |

* cited by examiner

Primary Examiner—Diane D. Mizrahi
(74) Attorney, Agent, or Firm—Christopher J. Palermo; Hickman Palermo Truong & Becker LLP

(57) ABSTRACT

A method and apparatus are provided for communicating network information among network devices using protocols based on Universal Resource Locators. In one embodiment, an apparatus for retrieving SNMP or video information in a network, or carrying out remote network access, comprises a first URL interface executed by a client; a second URL interface executed by a server having a plurality of stored values; and means distributed among the first URL interface and the second URL interface for creating and storing a URL that includes an identifier of one or more of the stored values, retrieving that value from the server based on the identifier, and transporting the value from the server to the client. In another embodiment, a method comprises creating and storing a URL that includes a request for the value; communicating the URL to the server; extracting the request from the URL; and communicating a responsive URL, which includes the value of the attribute and an identifier of the attribute, from the server to the requesting client.

19 Claims, 10 Drawing Sheets

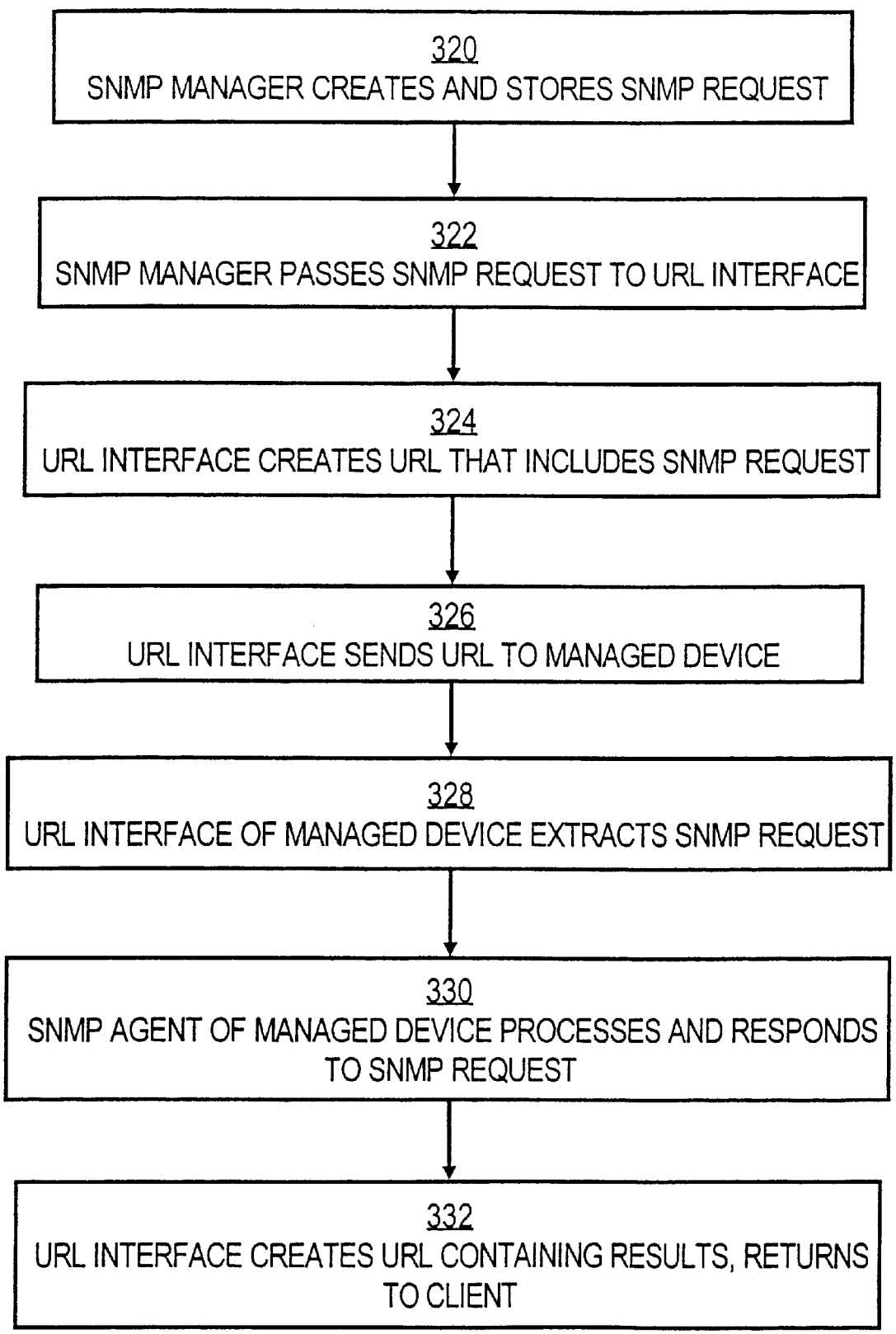

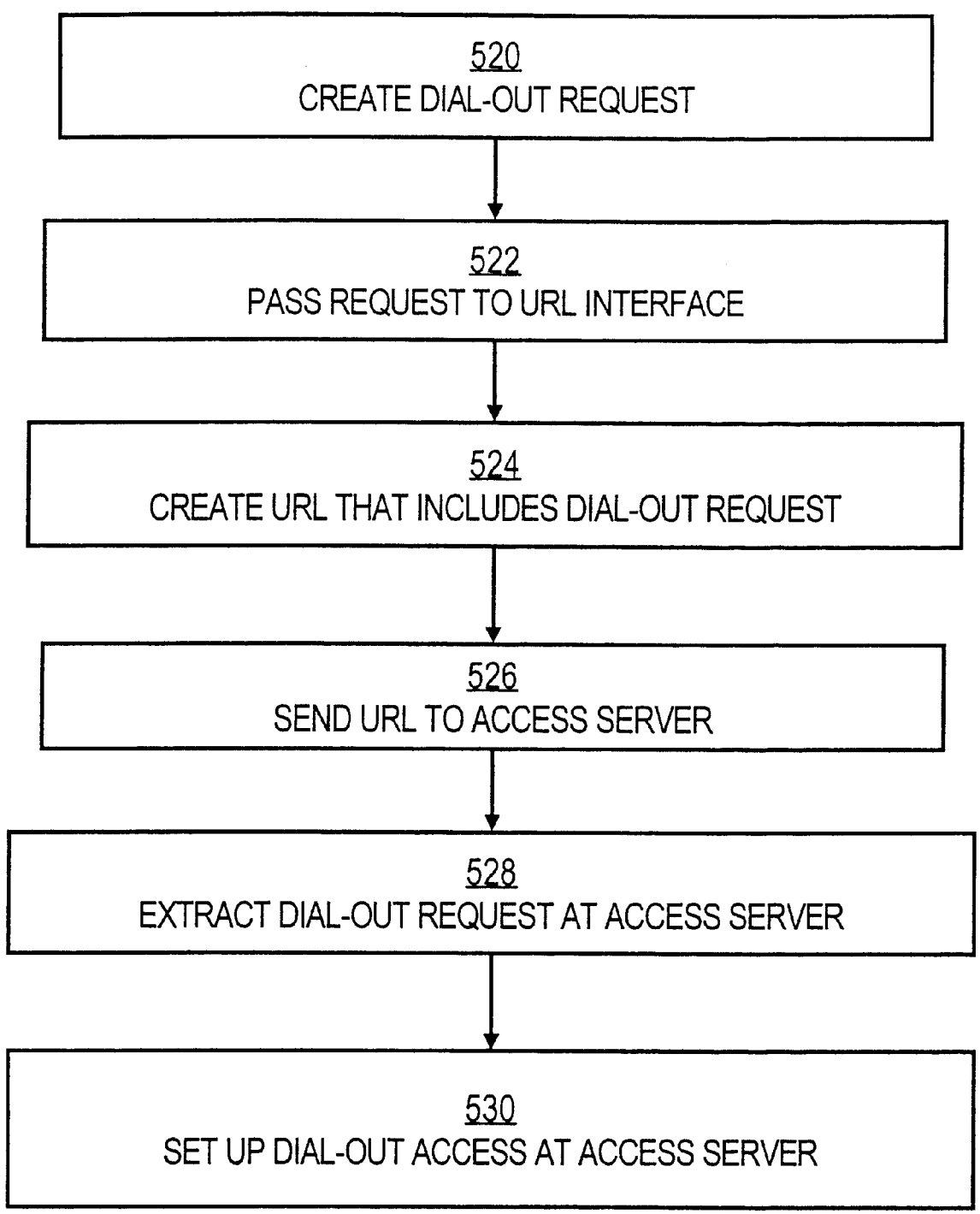

COMMUNICATING NETWORK INFORMATION USING UNIVERSAL RESOURCE LOCATORS

CROSS-REFERENCE TO RELATED APPLICATIONS

This application claims domestic priority under 35 U.S.C. §120 as a Divisional of prior, application No. 09/361,887, filed May 21, 1999, now U.S. Pat. No. 6,385,615 the entire contents of which are hereby incorporated by reference as if fully set forth herein.

FIELD OF THE INVENTION

The present invention generally relates to apparatus, methods and protocols useful in carrying out data communication between devices in a network. The invention relates more specifically to communicating network information among network devices using protocols based on Universal Resource Locators.

BACKGROUND OF THE INVENTION

A computer network generally includes a number of devices, including switches, routers and hubs, connected to allow communication among the devices. The devices within a network are often categorized into two classes: end stations such as workstations, desktop PCs, printers, servers, hosts, fax machines, and devices that primarily supply or consume information; and network devices such as gateways, switches and routers that primarily forward information between the other devices.

Each device has one or more circuit boards, a microprocessor and a memory, and runs a control program. In general, networks often include several different types of data switching and routing devices. These network devices may have different physical characteristics. New devices, with characteristics that are presently unknown, are constantly being developed. The characteristics of many network devices may change over time. For example, characteristics of the network devices change when subsystems like boards, network interface modules, and other parts are added or removed from a device. Further, network devices ordinarily operate on a continuous basis. Accordingly, many networks are managed, supervised and maintained by a network administrator or network manager.

To properly maintain a network, the network administrator needs to have up-to-date information available about the devices in the network and how the devices are interconnected. A network management system or network management software may be used to automate these tasks. To obtain information about the network, the network management system may communicate with network devices using an agreed-upon network management protocol. An example of a network communication protocol that facilitates network management is Simple Network Management Protocol ("SNMP"), which is described in "Introduction to SNMPv3," available on the Internet in the document "v3white.hmtl" of directory "snmpv3" at the World Wide Web domain "snmp.com", and "Internetworking Technologies Handbook," published by Cisco Systems, Inc.

SNMP is an asynchronous protocol that operates using a request-response model. A significant limitation of SNMP is that it may be used only for communications over networks that use Transmission Control Protocol and Internet Protocol (TCP/IP) for communication at lower network layers. There is a need for a way to use SNMP communications over networks that use other types of transport protocols such as IPX, SPX, and AppleTalk.

Certain network servers and other network devices communicate using the Remote Authentication Dial-In User Service (RADIUS) protocol. RADIUS is useful for controlling access, authentication, and accounting for remote users who dial in to a server to obtain network services. RADIUS is defined in, for example, "RADIUS: Remote Authentication Dial-In User Service: Remote Network Access Security in an Open Systems Environment," available on the Internet as document "radius.html" at World Wide Web domain "kmi.com." RADIUS operates below the application layer and tends to implemented in a network device in a way that is tightly coupled to the functions carried out by the device. In addition, because RADIUS is a lower-level protocol, obtaining and displaying management information in a human-perceivable manner requires use of an intermediate computer. Due to the limitations of RADIUS, some network management systems require one server for carrying out RADIUS access, authentication, and accounting (AAA) functions, and a second server that obtains RADIUS information, formats it, and generates one or more HTML pages containing the information.

FIG. 1 is a block diagram of a network management system in which Gateway 112 controls access by one or more Users 118 to a Managed Network 116. All network traffic directed from User 118 to Managed Network 116 must pass through Gateway 112 and is blocked unless the User is authenticated. Gateway 112 executes a Radius agent 114. For example, a system of this type may be used to configure a network using the 6510 Service Selection Gateway that is commercially available from Cisco Systems, Inc., San Jose, Calif. The Cisco 6510 contains three Fast Ethernet ports. A first port is connected to receive user traffic directed at a managed network; a second port is connected to the managed network; and the third port may be connected to a RADIUS server and a Service Selection Dashboard server on a separate subnet or the same network as the network side.

Gateway 112 communicates with Managed Network 116 and its devices using SNMP. A software application that provides user interface functions, DashBoard 108, executes in an HTTP Server 106 and communicates with the Gateway using a Radius host 110 complementary to Radius agent 114. HTTP Server 106 is coupled to Network 104 by a network link. A Client 100, which executes a Browser 102, is also coupled to Network 104 and may be located logically or physically remote from the Network, HTTP Server, and Gateway. Client 100 is a computer device such as a workstation, personal computer, server, or other equivalent network element. Network 104 in this embodiment is contemplated to be a global, packet-switched network that uses open protocols, such as the Internet. However, Network 104 may comprise any communication network. Browser 102 is an application program that may send and receive network information. Examples of commercial products that are suitable for use as Browser 102 are Microsoft Internet Explorer® and Netscape Navigator®.

In this arrangement, HTTP Server 106 communicates with Gateway 112 using RADIUS protocol messages, and communicates with Browser 102 using HTML over an HTTP network. This arrangement is functional, however, it would be simpler and less expense to provide a way to directly query and display RADIUS information using a client or server that can communicate using HTML. In addition, the foregoing arrangement requires the Gateway 112 or the DashBoard application 108 to store state information so that HTML transactions can be correlated with RADIUS transactions.

Another problem in this field is that streaming video information cannot be communicated efficiently over every network element. For example, there are now several different streaming video client programs available, such that streaming video is becoming ubiquitous. The video clients are capable of executing on a variety of platforms and can receive video information that is transported over many different network protocols. There is also increasing interest in the use of programs written in the Java® language to carry out network processing functions. However, at present Java® applets require the use of TCP/IP as a transport protocol.

A related problem is that using conventional streaming video clients and transport protocols, when a video stream is carried through the network, certain internetwork elements may not be set immediately to the best available quality of service. Delivery of streaming video requires network elements having high bandwidth and throughput to be continuously available. However, the network elements and the software that manages them may take considerable time to recognize the nature of the stream and set each internetwork element to an appropriate quality of service.

The Universal Resource Locator (URL) provides a way to identify a multimedia resource in a network. The URL is defined in T. Berners-Lee, "Uniform Resource Locators (URL): A Syntax for the Expression of Access Information of Objects on the Network," Mar. 21, 1994. However, in the past, the use of URLs for locating information in a network has required a network that communicates using Hypertext Transfer Protocol (HTTP). This protocol is not available in all network devices. Many devices, such as switches and routers, cannot respond to control messages that are communicated using HTTP. In addition, HTTP works only at OSI Layer 4. Thus, there is a need for a system that use URLs to address network information at devices that do not use HTTP.

SUMMARY OF THE INVENTION

The foregoing needs and objects, and other needs and objects that will become apparent from the following description, are achieved by the present invention, which comprises, in one aspect, a method of retrieving a value of a RADIUS accounting attribute that is stored in a RADIUS server of a network. In an embodiment, the method may comprise creating and storing a Uniform Resource Locator (URL) that includes a request for a value of the RADIUS attribute; communicating the URL to the RADIUS server; extracting the request from the URL; and communicating a responsive URL, which includes the value of the attribute and an identifier of the attribute, from the RADIUS server.

In another aspect, the invention provides a method of processing a value of a RADIUS accounting attribute that is stored in a RADIUS server of a network, involving executing a RADIUS agent and an interface software element at the managed device; creating and storing a Uniform Resource Locator (URL) that comprises a request for the RADIUS accounting attribute at the client computer system, the request including information identifying the attribute and a type of processing to be carried out; processing the request based on the type to result in the value of the attribute; and communicating the value of the attribute to the managed device in a responsive URL.

According to another aspect, the invention provides a method of retrieving a value of a Management Information Base (MIB) variable that is stored in a MIB of a managed device in a network. A Uniform Resource Locator (URL) that includes a Simple Network Management Protocol (SNMP) request for a value of the MIB variable is created and stored. The URL is communicated to the managed device. The SNMP request is obtained from the URL. A responsive URL is communicated, which includes the value of the MIB variable and an identifier of the MIB variable, from the managed device.

In another aspect, the invention provides a method of processing a value of a Management Information Base (MIB) variable that is stored in a MIB of a managed device of a network. The method may involve executing an SNMP agent and a first URL interface software element at the managed device; creating and storing a Uniform Resource Locator (URL) that comprises an SNMP request for the MIB variable at the managed device, the request including information identifying the MIB variable and a type of SNMP processing to be carried out; processing the request based on the type to result in retrieving the value of the MIB variable; and communicating the value of the MIB variable to the managed device in a responsive URL.

Other aspects of the invention include an apparatus and a computer-readable medium configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3B is a flow diagram of a method of carrying out SNMP communications using URLs.

FIG. 5B is a flow diagram of a method of carrying out dial-out communications using URLs.

DETAILED DESCRIPTION OF THE PREFERRED EMBODIMENT

A method and apparatus for communicating network information among network devices using protocols based on Universal Resource Locators is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

METHODS OF COMMUNICATION BASED ON THE URL

1. RADIUS COMMUNICATION BASED ON URL

Figure 2A:
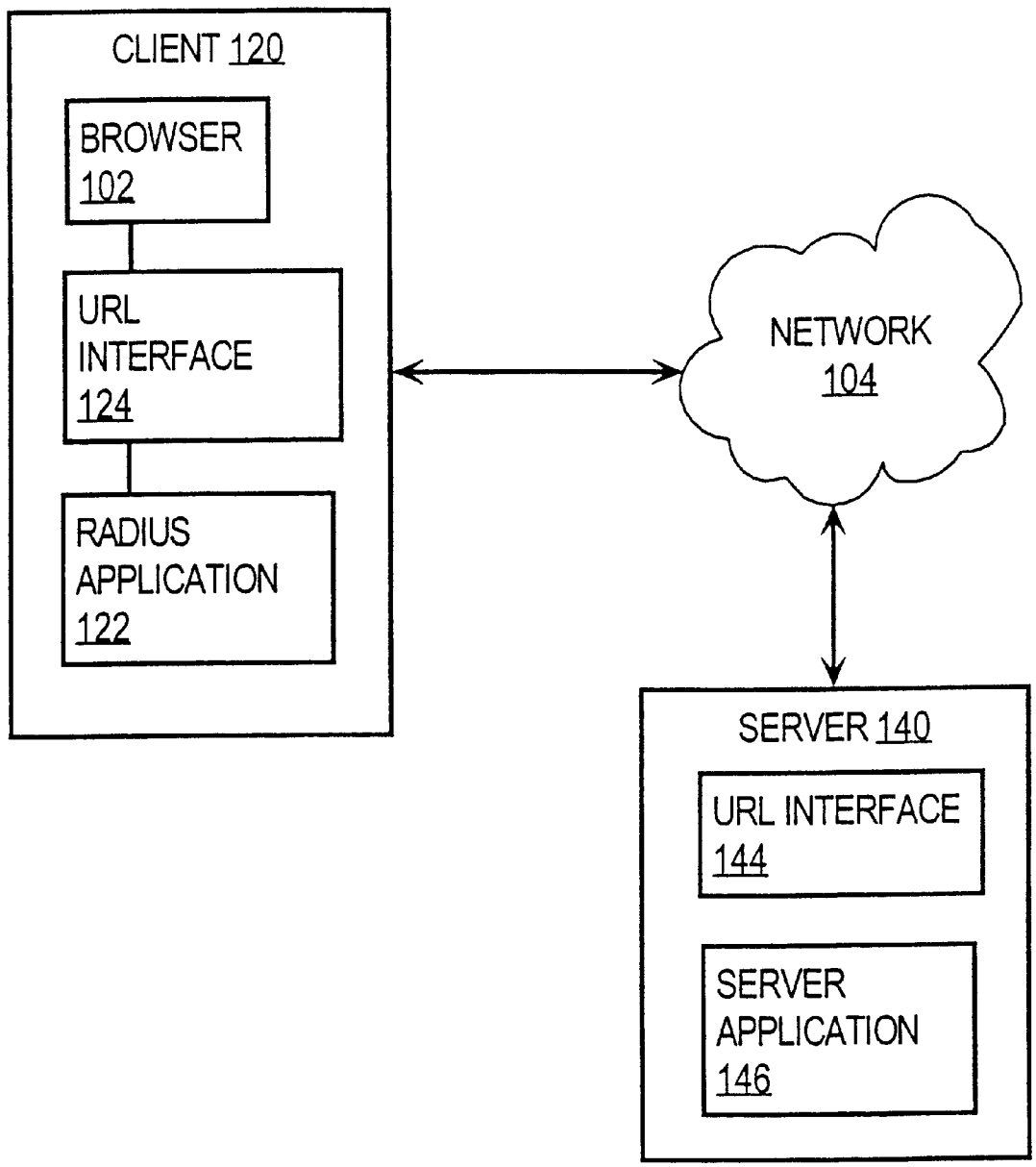
FIG. 2A is a block diagram of a network management system that uses URLs for RADIUS communications.

FIG. 2A is a block diagram of a network management system that uses URLs for communication of RADIUS information. Client 120 is a computer device that executes a Browser 102 and Radius Application 122 having a URL Interface 124. Client 120 is logically coupled through Network 104 to Server 140, which executes a Server Application 146 having a URL Interface 144. Radius Application 122 is any application program that requires use of RADIUS information that is stored at or generated by Server 140. Server 140 may include one or more different RADIUS dictionaries that can be accessed by URL calls from Client 120. URL Interfaces 124, 144 enable Client 120 and Server 140 to communicate RADIUS attribute-value pair information according to a protocol based on the URL.

In one embodiment, at Client 120, URL Interface 124 may be implemented in the form of an application program executed in Browser 102. For example, URL Interface 124 may be a Java® applet. Radius Application 122 also may be implemented in Java classes.

Figure 2B:
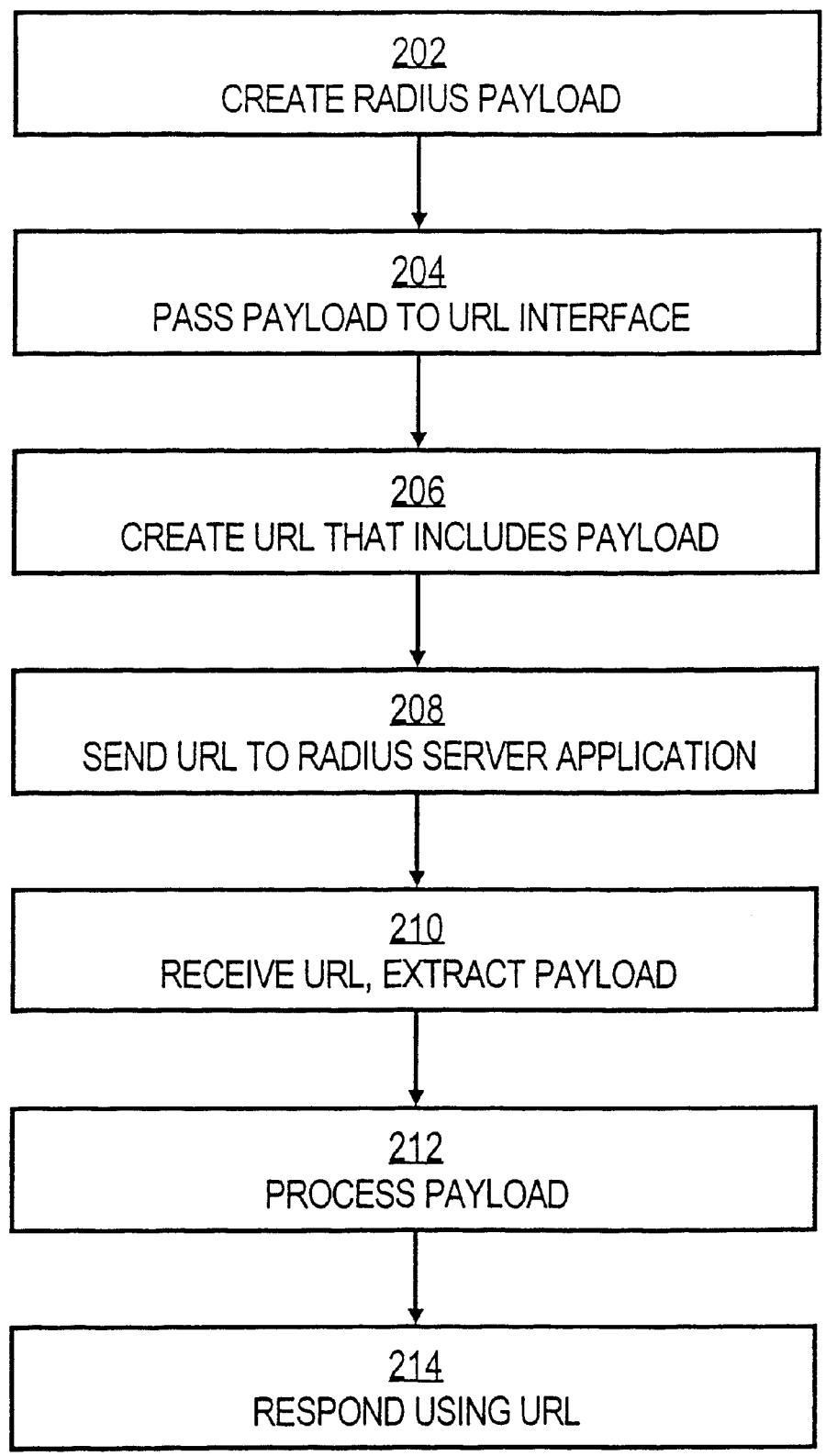
FIG. 2B is a flow diagram of a method of carrying out RADIUS communications using URLs.

FIG. 2B is a flow diagram showing a process that may be carried out when Radius Application 122 needs to communicate with Server 140 using RADIUS information.

In block 202, the Radius Application creates a RADIUS request or package of information ("payload"). In block 204, the Radius Application passes the payload to URL Interface 124. Radius Application 122 also requests URL Interface 124 to communicate the information to Server 140. In response, URL Interface 124 creates a text string or command in the form of a URL, as shown by block 206. URL Interface 124 then communicates the URL to Server 140, as shown by block 208.

In the preferred embodiment, a URL for communicating RADIUS information has the form:

radius[s]://<server-name>:<port#>/<operation>/<radius payload>

Client 120 may obtain RADIUS information from Server 140 by creating and sending a URL command in the foregoing form from the client to the server. The designation "[s]" indicates that the character 's' is an optional parameter or "switch" that may be included in the URL. Including the character 's' indicates that a secure connection is to be established between Client 120 and Server 140.

The value <server-name> is the name of the server that implements the URL based RADIUS protocol. For example, <server-name> may be an IP address or a server name that can be resolved using conventional Domain Name Service (DNS) processes. The value <port#> identifies a listening port number for the URL-based RADIUS process on the server. The value <operation> identifies an operation that the Client 120 is requesting Server 140 to carry out. In the preferred embodiment, <operation> may have the value Get or Set. The value <radius payload> comprises a Radius dictionary name and one or more attribute-value pairs. The Radius dictionary name identifies a Radius dictionary that is stored at Server 140.

At Server 140, URL Interface 144 receives the URL and extracts the payload, as indicated by block 210. The payload is then processed, as shown by block 212. For example, the payload is communicated to Server Application 146, which gets or sets RADIUS values in one or more of the RADIUS dictionaries of Server 140. If the Client 120 has requested RADIUS information, then Server Application 146 obtains the needed information, prepares a return payload, and passes it to URL Interface 144. In block 214, Server 140 responds to the client request using a response message in the form of a URL. For example, the RADIUS information is returned to the Client 120 in the form of attribute-value pairs embedded in the payload of a URL.

As a specific example, to set a value of an attribute of a Radius dictionary on Server 140, Client 120 prepares a URL of the form:

radius://serverA:9091/Set/cisco/"Attribute=username"/ "Value=myname"

This operation sets the attribute 'username' to the value 'myname' within the dictionary 'cisco'.

To retrieve or Get an attribute value, Client 120 prepares a URL of the form:

radius://serverA:9091/Get/cisco/"Attribute=username"

This operation returns the value of the attribute 'username' from the dictionary 'cisco'.

To retrieve the entire contents of a dictionary, Client 120 prepares a URL of the form:

radius://serverA:9091/Get/cisco

This operation returns all the attribute-value pairs within the 'cisco' dictionary of Server 140.

The URLs that are sent and received by the URL Interfaces may be communicated using Hypertext Transfer Protocol (HTTP) as a transport mechanism. Thus, each URL may be embedded in an HTTP request or response, and the network connections between Client 120 and Server 140 may use transport protocols that support HTTP, such as TCP/IP. Alternatively, the transport mechanism may be Hypertext Markup Language (HTML) and the network connections may use any protocols that can communicate HTML information, such as IPX, AppleTalk, etc.

Figure 1:
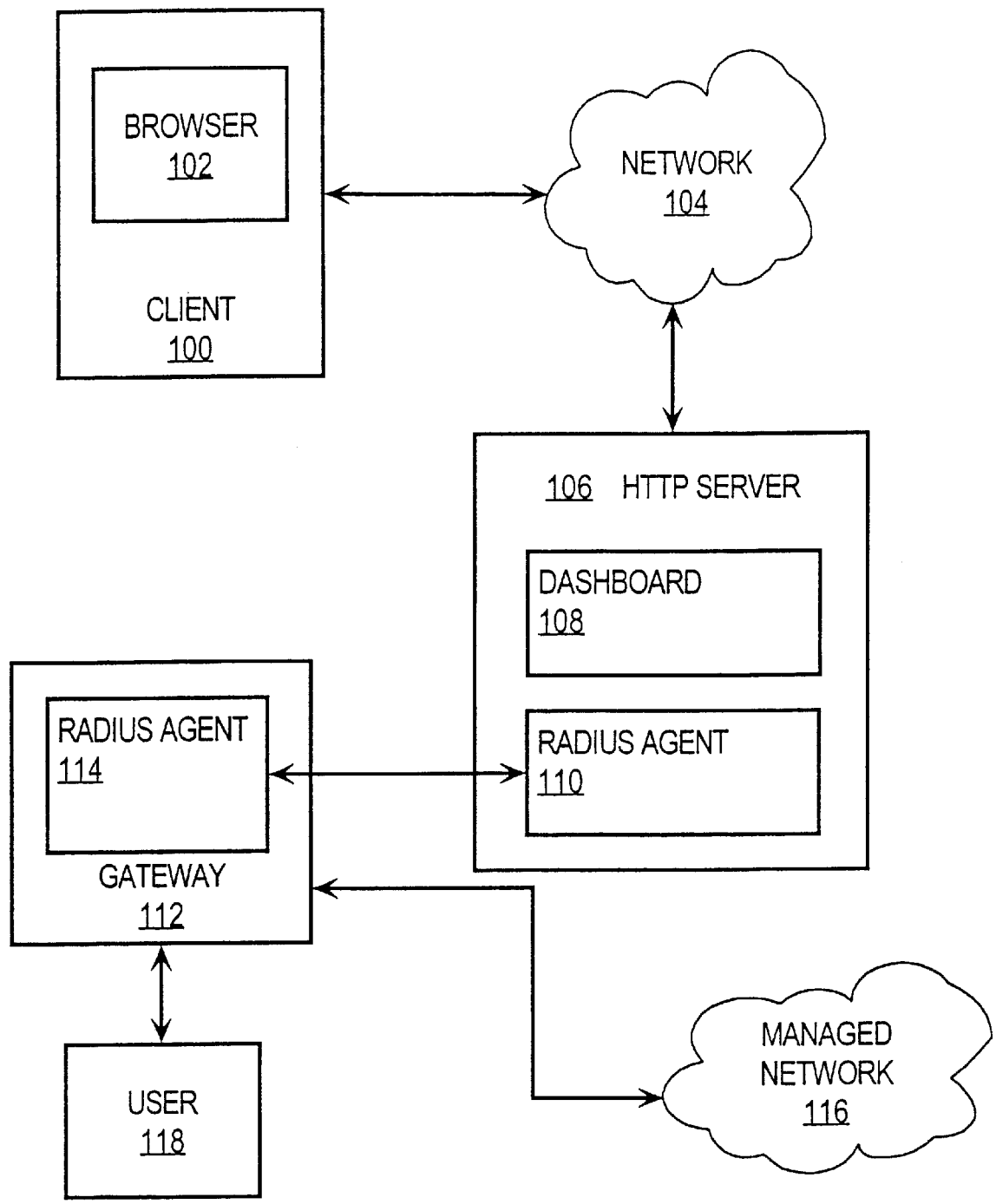
FIG. 1 is a block diagram of a network management system.

Accordingly, a URL-based RADIUS server interface allows clients to access RADIUS attribute-value pairs from within specified RADIUS dictionaries without directly communicating in the RADIUS protocol. As a result, in a system of the kind shown in FIG. 1, Radius Application 122 of Client 120 can assign values to Gateway 112 directly, circumventing the conventional, indirect path through the HTTP Server 106. Further, there is no need to store state information because URLs may be exchanged using conventional stateless transport protocols.

2. SNMP COMMUNICATION BASED ON URL

Figure 3A:
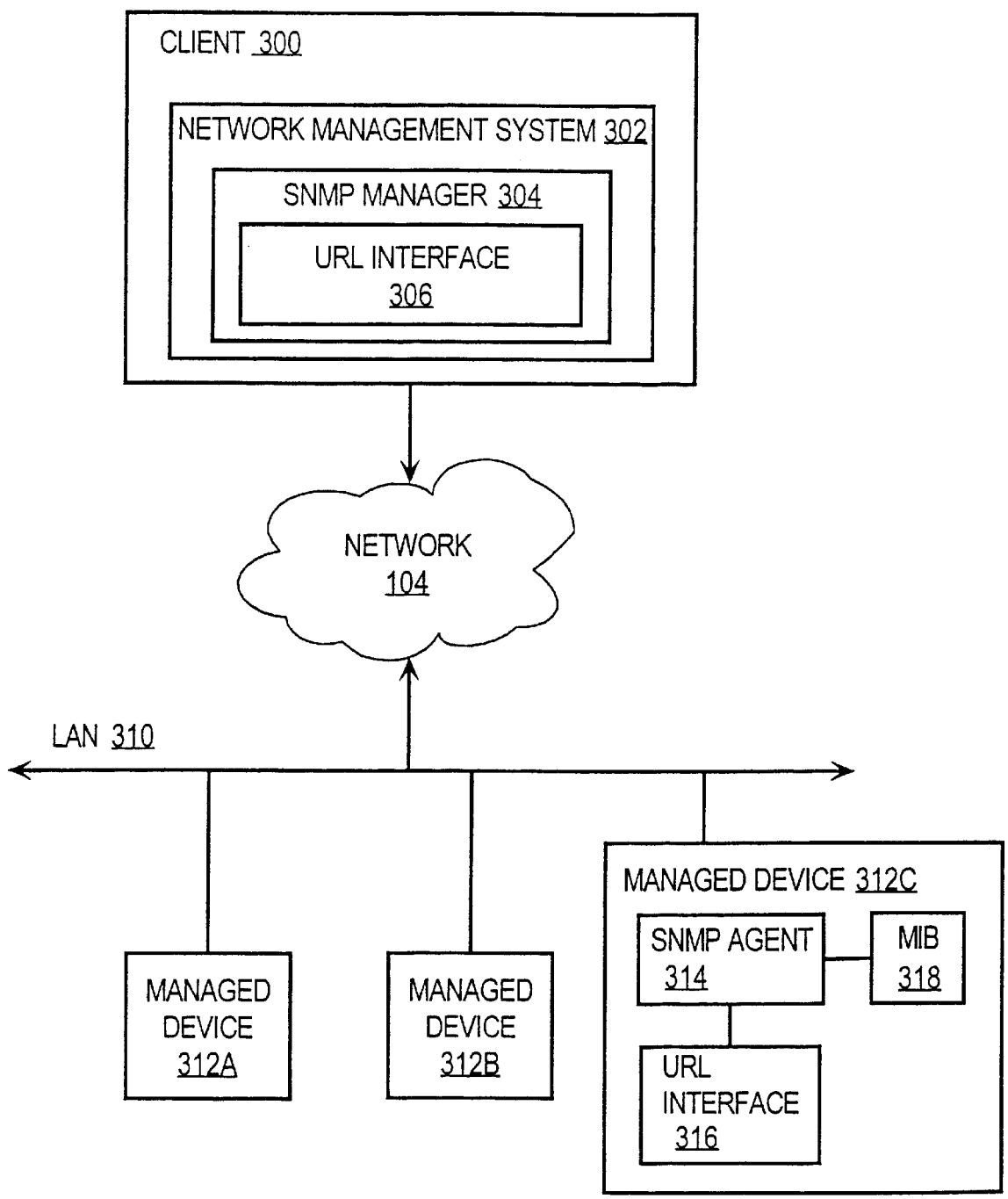
FIG. 3A is a block diagram of a network system that uses URLs for SNMP communications.

FIG. 3 is a block diagram of a network system that may communicate SNMP information using URLs.

Client 300 executes a Network Management System 302, which is one or more software elements, programs or processes that provide network management functions. An example of a commercial product that is suitable for use as Network Management system 302 is Cisco Resource Manager, available from Cisco Systems, Inc., San Jose, Calif. One element of Network Management System 302 is SNMP Manager 304, which generates, receives, and processes network information using messages under the SNMP protocol. The Asynchronous Network Interface (ANI) element of Cisco Resource Manager is an example of an SNMP Manager. SNMP Manager 304 includes a URL Interface 306, which can package SNMP information in a URL payload and convey it to another system or device.

Client 300 is coupled through Network 104 to a managed network in the form of Local Area Network (LAN) 310. In this configuration, Client 300 may use Network Management System 302 to manage LAN 310 remotely. Alternatively, Client 300 may be coupled directly to LAN 310.

LAN 310 includes one or more Managed Devices 312A, 312B, 312C. Each Managed Device is a network element such as a router, switch, gateway, or similar element. As illustrated in FIG. 3 in the case of Managed Device 312C, each of the Managed Devices includes an SNMP Agent 314, which is a software element that can send and receive network messages in the SNMP protocol. LAN 310 may also include non-managed devices that do not have an SNMP Agent.

Each Managed Device has a URL Interface 316 at the application layer that is coupled to SNMP Agent 314. URL Interface 316 can receive an SNMP message from SNMP Agent 314, package the message in a URL, and forward the URL across LAN 310 and Network 104 to the complementary URL Interface 306 of Client 300.

Each Managed Device also has one or more Management Information base (MIB) 318. Each MIB comprises one or more tables of records. The records can be accessed by URL calls. The MIB information is returned to the calling client or process in the form of pairs of MIB variables and values.

Conventional SNMP implementations do not enable MIB information to be retrieved using the URL format. According to the embodiment of FIG. 3, information from network devices may be retrieved using URLs. In the preferred embodiment, Client 300 may retrieve MIB information from a Managed Device using a URL having the following form:

snmp[s]://<server-name>:<port#>/<operation>/<snmp payload>

The character 's' is an optional parameter or switch which, when present, indicates that communications between Client 300 and a Managed Device should be carried out in a secure mode. The value <server-name> is the name of a server that implements the URL based SNMP protocol, such as Managed Device 312C. The <server-name> value may be an IP address, for example. The value <port#> identifies a listening port number for the URL-based SNMP process on the server. For example, the port value may identify URL Interface 316. The value <operation> indicates the type of SNMP operation to be carried out by SNMP Agent 314 of the Managed Device. In one embodiment, the operation value may be Get or Set. The value <sump payload> comprises one or more MIB attribute-value pairs.

Using the foregoing protocol, Client 300 may Get a value of a MIB attribute, or Set a MIB attribute value.

FIG. 3B is a flow diagram of a method of using a URL-based SNMP communication system. Assume that Network Management System 302 needs to obtain the current values of one or more MIB variables from Managed Device 312C. In block 320, the SNMP Manager of the Client, or an equivalent element, creates and stores an SNMP request for the value of the MIB variables. The request may be stored the form of a string that includes the request and the attribute values. In block 322, the SNMP Manager passes the SNMP request to the URL Interface. In response, the URL Interface creates and stores a URL that includes the SNMP request string as part of the payload of the URL, as shown in block 324. For example, to set a MIB value, URL Interface 306 of Client 300 would create a URL of the form:

snmp://serverA:9091/Set/"Attribute=stationname"/ "Value=mystation"

This operation instructs SNMP Agent 314 of the managed device to set the MIB attribute 'stationname' to the value 'mystation'.

To get a MIB value, URL Interface 306 of Client 300 would create a URL of the form:

snmp://serverA:9091/Get/"Attribute=stationname"

This operation returns the value of the MIB attribute 'stationname'.

To get the entire contents of the MIB table of a particular managed device, the Client would create and send a URL of the form:

snmp://serverA:9091/Get

This operation returns all the attribute-value pairs within the MIB table for the specified server.

In block 326, the URL is communicated to the Managed Device that has the needed MIB information. In block 328, the URL Interface of the Managed Device decodes the URL, extracts the SNMP request string, and passes the SNMP request string to the SNMP agent of the Managed Device. The SNMP Agent of the Managed Device processes and responds to the SNMP request, as indicated by block 330. The URL Interface of the Managed Device then creates a responsive URL that contains the results of the SNMP request, such as one or more attribute/value pairs, in the payload of the URL. The responsive URL is returned to the client, as shown by block 332.

Accordingly, a URL-based SNMP server interface allows clients to access MIB attribute-value pairs without directly using SNMP communications. As a result, Network Management tools may be distributed more broadly and may achieve wider use.

3. VIDEO COMMUNICATION BASED ON URL

Conventional network video services include a client application that can receive video data from a video source. The video source could be a stored, pre-recorded movie, a television channel, a file stored in Motion Picture Experts Group (MPEG) format, etc. Examples of client applications include RealVideo and PC-TV. In the past, these applications have been highly machine-dependent and have user interfaces that are not standardized.

According to an embodiment, a URL-based video provides a way to use the Universal Resource Locator to convey video information. A URL-based video client can use a World Wide Web browser to gain access to a video source. As a result, a common interface is provided for video services.

Figure 4A:
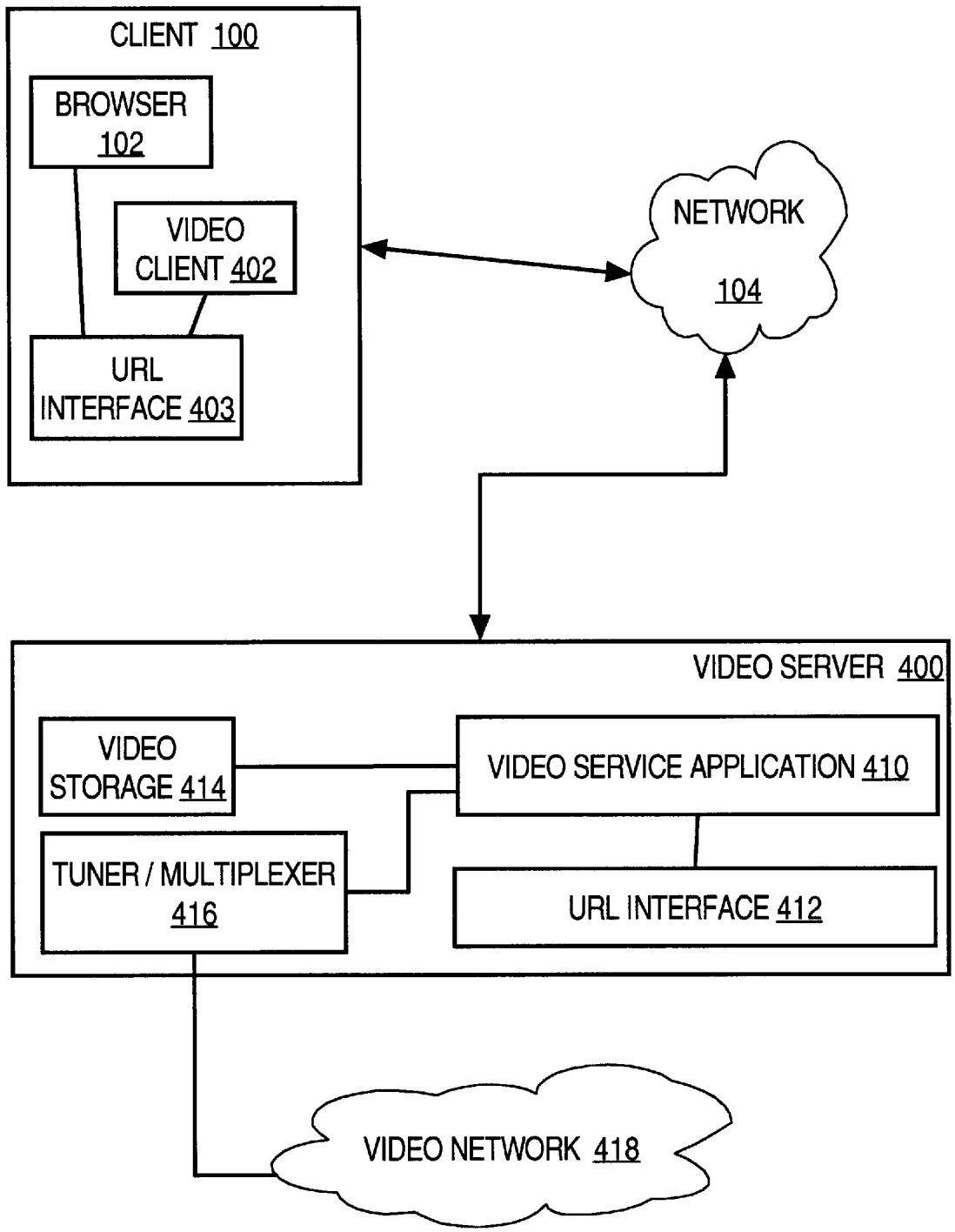
FIG. 4A is a block diagram of a network system that uses URLs for video communications.

FIG. 4A is a block diagram of a network system that can communicate video information using URLs. Client 100 executes a Browser 102 and Video Client 402, which may be a browser plug-in such as RealVideo, etc. Browser 102 and Video Client 104 also interoperate with a URL Interface 403. In one embodiment, URL Interface 403 is a plug-in for Browser 102; the URL Interface also may be integrated into the Browser or the Video Client.

Client 100 is coupled directly or indirectly through Network 104, to Video Server 400. The principal functions of Video Server 400 are to receive requests for video content from clients through Network 104, retrieve copies of the requested video content, and deliver the video content over the Network. Video Server 400 may comprise a Video Service Application 410 having URL Interface 412, and Video Storage 414. Video Service Application 410 is a software element or process that manages access to digitally stored copies of motion pictures, television programs, or other video information, which is stored in Video Storage 414. For example, Video Application 410 may implement a video-on-demand service whereby a remote client may request and replay a motion picture in video format over the Network. Video Service Application 410 is responsible for obtaining the video information from Video Storage 414 and delivering it to Client 100 over Network 104.

In one embodiment, Video Service Application 410 also interoperates with a Tuner/Multiplexer 416, which is coupled logically to a Video Network 418. The Video Network 418 represents one or more publicly available sources of video information or programming, such as a cable television network, broadcast television network, or the equivalent. Tuner/Multiplexer 416 can select one channel from Video Network 418 and deliver real-time video content from that channel to Client 400 over Network 104.

Figure 4B:
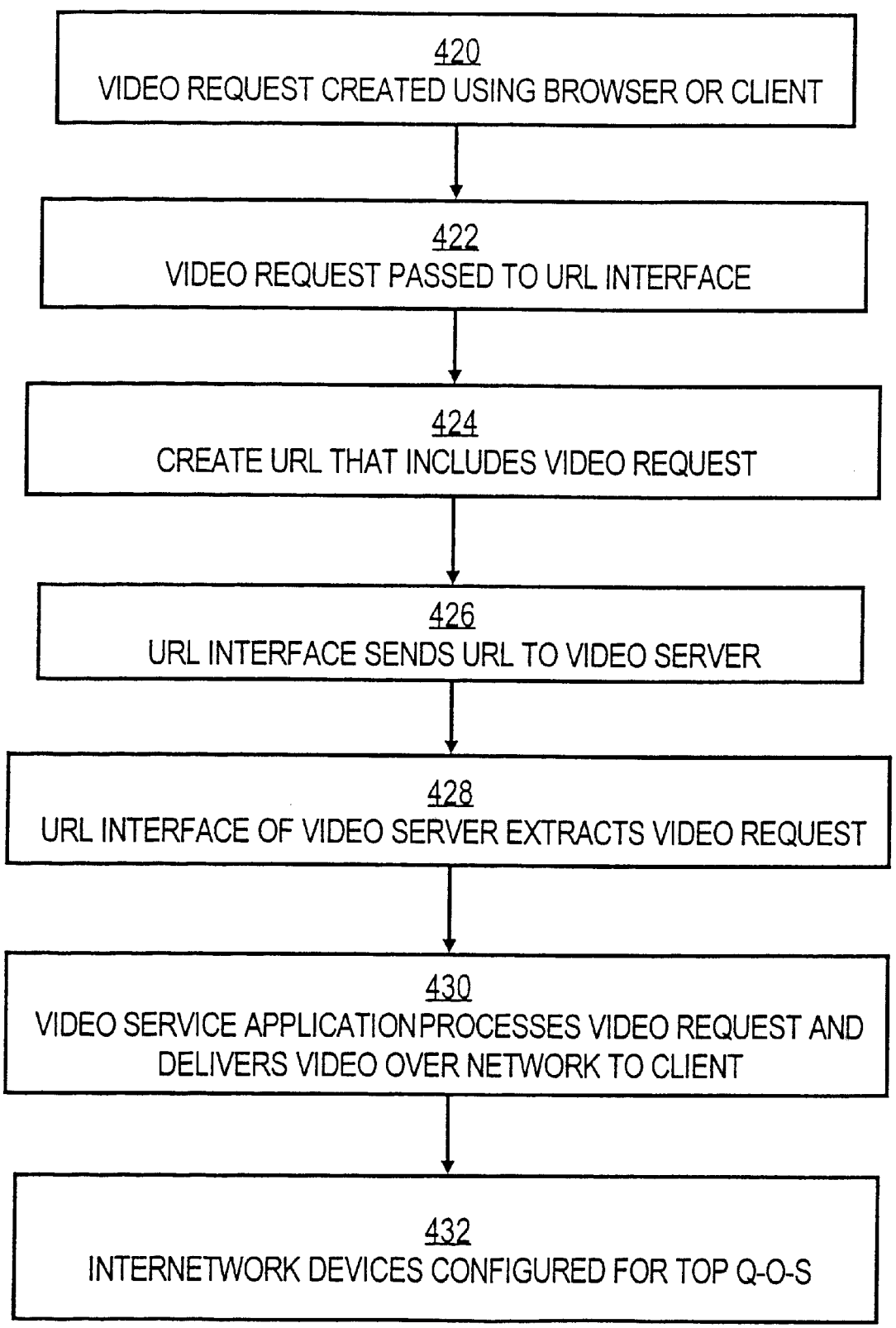
FIG. 4B is a flow diagram of a method of carrying out video communications using URLs.

FIG. 4B is a flow diagram of a method of delivering video information over a network using URLs.

In block 420, a video request is created using a client. For example, assume that a user of Client 100 is browsing information using the Internet and arrives at an Internet site that offers video content. Client 100 selects a source of video content, for example, by selecting a hyperlink using Browser 102. In response, Client 100 activates Video Client 402, which attempts to retrieve the video content and display it on the Client. At this point, Video Client 402 may create a request for the video content. In block 422, the request is passed to a URL Interface. For example, Video Client 402 may pass the name of a particular video file stored on a remote server to URL Interface 412.

In block 424, a URL is created that includes the video request. Block 424 may involve several modes of operation. In one mode, URL Interface 412 creates and stores a URL based on the request it received from Video Client 402. In another mode, Browser 102 creates a URL that contains a video request. In still another mode, a user of Client 100 directly enters a URL that contains a video request in the command line of the browser.

In any of these modes, Client 100 may access a remote video source in Video Network 418 by delivering a video URL to Video Server 400 in the following format:

video[s]://<server-name>:<port#>/<video payload>

The character 's', when present, is an optional parameter or switch that instructs Video Server 400 to deliver the video information in a secure mode. The value <server-name> is the name of the server that implements the URL based video protocol. For example, the server name value may be an IP address or domain name of Video Server 400. The value <port#> identifies a listening port for a URL-based video process on the server. For example, the port number value may identify Video Service Application 410. The value <video payload> contains an identifier of particular video information that the Client wishes to retrieve.

In block 426, the URL is sent to the Video Server. For example, URL Interface 106 of the Client 100 sends the URL to Video Server 400. At the Video Server, the video request in the URL is extracted, as shown by block 428. A video service or application of the video server processes the request and delivers video information over the network to the client, as indicated by block 430. Optionally, devices in the Network 104 are configured to set up top-level quality of service for the video information as it passes through the network.

The foregoing protocol may be used for many different kinds of video services. For example, the video protocol may be used to enable Client 100 to view a television channel in real time. Client 100 sends Video Server 400 a protocol request of the form:

video://ABC:9091/sixoclocknews

This operation causes Client 100 to open a video window that carries a program on a server of the ABC television network, "sixoclocknews," from Video Network 418 to the client.

The video protocol also may be used to enable Client 100 to view a stored video program on demand. For example, Client 100 sends Video Server 400 a protocol request of the form:

video://VideoRentalCompany:9091/TheCiscoKid

In response, a video-on-demand server affiliated with an enterprise called Video Rental Company retrieves and delivers a video copy of the motion picture "The Cisco Kid" to the Client 100.

Accordingly, a URL-based video server interface allows clients to access video services using the URL convention. As a result, top quality-of-service levels are established in internetwork elements more quickly. A request may be determined, rapidly, to be a video request that requires top level quality of service. All devices in the path of the traffic can be set to handle the traffic with high quality of service levels.

4. DIAL-OUT COMMUNICATIONS BASED ON THE URL

Figure 5A:
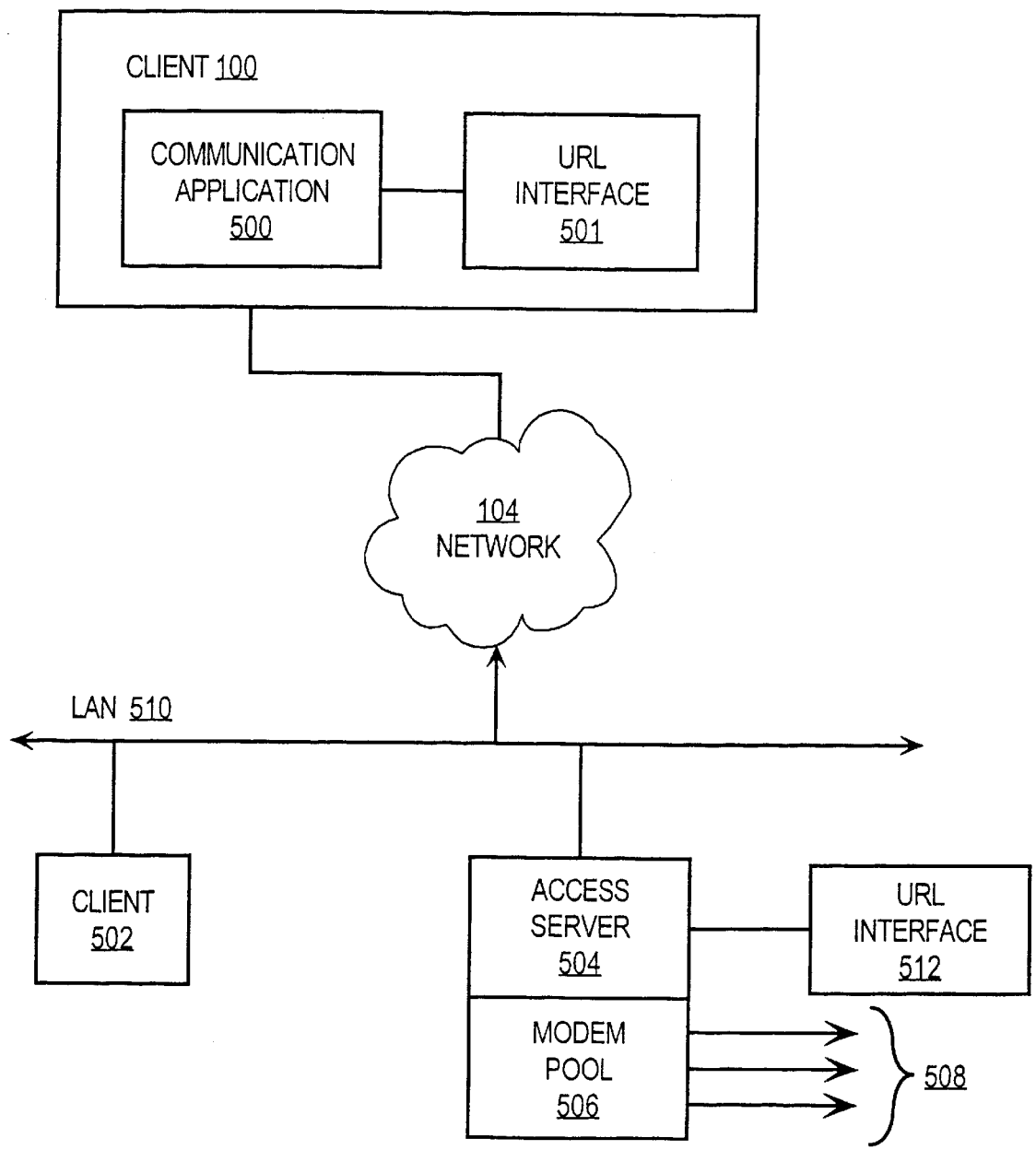
FIG. 5A is a block diagram of a network system that uses URLs for dial-out communications.

FIG. 5A is a block diagram of a network system whereby a client may connect to a remote network from a local network.

Client 100 executes a Communication Application 500 that has a URL Interface 501, and is logically coupled to a Network 104. Communication Application 500 is one or more software elements or processes that can establish data communications with a remote server or client. Communication Application 500 may be an email client with terminal emulation capabilities, such as Qualcomm Eudora Pro; a fax program, such as JetFax; a video application; an Internet telephony application; a directory service application; or any other client application that interoperates with remote information over a network.

A LAN 510 is coupled to Network 104 at a location logically separate from Client 100. A Client 502 and one or more other network elements are coupled to the LAN 510. At least one Access Server 504 is coupled to Network 104. Access Server 504 controls access of Clients 100, 502 to one or more modems in a Modem Pool 506. The modems of Modem Pool 506 are coupled using network links 508 to remote networks or servers.

In this configuration, Client 100 may use Communication Application 500 to request a connection to a remote network or server that is logically coupled to Modem Pool 506. Communication Application 500 prepares a request for access and sends it to Access Server 504. The request for access identifies Client 100 or the account of a user who is using the Client. Access Server 504 carries out authentication, access and accounting functions relating to the user. If the user is authenticated successfully, Access Server 504 grants Client 100 access to one of the modems in Modem Pool 506, and commences a dial-out connection. Most conventional dial-out utilities use native application services to establish such dial out connections. These applications are usually native to the machine they are running on and present different user interfaces to the clients. According to an embodiment, a URL-based dial-out protocol is provided. The protocol provides a common user interface to the access server for dial-out connections. Several applications can be made available independent of the architecture of the client machine, including fax, voice, video, directory services, terminal emulation, etc. The preferred URL-based dial-out protocol adheres to the X.121 addressing scheme. A connection and application that uses the connection can be initiated via a World Wide Web browser using the protocol.

In the preferred embodiment, a URL-based dial-out protocol request has the form:

dial[s]://<server-name>:<port#>/<application>/<X.121 address>

The character 's' is an optional parameter or switch which, when present, instructs a server such as Access Server 504 to set up the dial-out connection in a secure mode. The value <server-name> may be the name of a server that implements the URL based dial-out protocol and services. For example, <server-name> may be an IP address or DNS name of Access Server 504. The value <port#> identifies a listening port number for a URL-based dial-out process on the server; for example, the <port#> value may identify URL Interface 512.

The value <application> identifies what type of dial-out application is being requested. In one embodiment, the value <application> is one of the following: Fax, Voice, Video, Terminal Emulation, Directory Services. Any other useful application may be provided. The value <X.121 address> provides an address according to the format of ITU Standard X.121.

FIG. 5B is a flow diagram of a process of establishing a dial-out connection. In block 520, a dial-out request is created. For example, a user of Client 100 operates Communication Application 500 to request a dial-out connection. This could involve, for example, user executing an Internet telephony application and instruction the application to go off-hook and start a new call. In block 522, the request is passed to a URL Interface, such as the URL Interface 501 of Client 100. In an alternate embodiment, the URL Interface may be integrated into Communication Application 500.

In block 524, a URL is created that includes the dial-out request information within the URL. For example, assume that Client 100 is initiating a voice service call. The URL may have the form:

dial://serverA:9091/Voice/7145551212

This example requests a remote server named serverA to start an Internet telephony application on that server, using the X.121 address "7145551212" to make a connection to telephone number +1-714-555-1212. The voice application will interact with Client 100 using information carried over Internet protocol networks.

In block 526, the URL is sent to a dial-out access server, such as Access Server 504 of FIG. 5A. In block 528, the dial-out request is extracted from the URL. Block 528 may involve causing URL Interface 512 to scan the URL and separate the server name, listening port number, service value, and address value from the dial-out request information.

In block 530, dial-out access is set up at the access server. This may involve communicating the values which were extracted from the URL to a remote server that implements the desired service, using Modem Pool 506. As a result, a connection is established from the remote server to the Client 100, without use of software or protocols that are specific to the client or to the desired service.

As another specific example, Client 100 may initiate a video service call using a URL of the format:

dial://serverA:9087/Video/7145551212

In response, Access Server 504 will start a World Wide Web based video conference application on the server serverA and will use the X.121 address to make the connection. The video application of serverA interacts with Client 100 by communicating two way streaming video over Internet protocol networks.

ALTERNATIVE METHODS OF COMMUNICATION

1. NFS COMMUNICATIONS BASED ON URL

Network File Systems allow a client to mount a remote file system on a local machine and access the files and directories contained there. Access is accomplished through the NFS client applications. Presently these applications are machine dependent and have a particular user interfaces that are not common.

A URL-based NFS Protocol introduces the notion of using Universal Resource Locator to convey NFS protocol information. The URL-based NFS client is able to use a World Wide Web browser to gain access to the remote file system. This introduces a common interface to the NFS services. The client accesses the remote file system by entering the NFS URL as specified below.

The URL-based NFS Protocol definition is as follows:

nfs[s]://<server-name>:<port#>/<nfs payload>
    (when including 's' the transport is in secure mode)
        <server-name>—The name of the server that implements the URL based NFS protocol.
        <port#>—The listening port number for the URL-based NFS process on the server.
        <nfs payload>-<[open][delete]>/<path> or
        <[copy][move]>/<source path>/<destination path> or
        <path>-<directory path>[/<filename>]
        <source path>-[<server name>[:<port#>/]<path>
        <destination path>-[<server name>[:<port#>]/] <path>

The operations a Client can perform through this protocol are as follows:

Opening a directory in the remote file system.
Opening a file in the remote file system.
Deleting a file or directory.
Copying a file or directory.
Moving a file or directory.
Operations examples:
Opening a directory:
nfs://serverA:9091/open/"/user/local/tsmith/bin"

This operation is opening the directory /user/local/tsmith/bin on server 'serverA'. The results of the open can be displayed in the browser.

Copying a file:
nfs://serverA:9091/copy/"/user/local/tsmith/myfile"/"/tmp"

Accordingly, a URL-based NFS server interface allows clients to access NFS services using the URL convention.

2. DECNET COMMUNICATIONS BASED ON URL

Most routers support an implementation of the DECNET routing protocol. This protocol and its corresponding routing tables are based upon network addresses. There is currently no support in this protocol to take advantage of the emerging World Wide Web technology and URL-based addressing.

A URL-based DECNET Protocol introduces the notion of using a Universal Resource Locator to convey DECNET protocol information. Each URL-based DECNET protocol router has routing tables that utilize URL-based addressing. The router uses these table entries to locate both the next-hop and destinations. The URL-based DECNET Protocol definition is as follows:

decnet[s]://<router-name>:<port#>/<operation>/<decnet payload>
    (when including 's' the transport is in secure mode)
        <router-name>—The name of the router that implements the URL Based DECNET protocol.
        <port#>—The listening port number for the URL-based DECNET process on the router.
        <operation>—One of the following: Add, Delete, Get, Update
        <decnet payload>-<destination address in URL-based format>, <level>, <next hop address in URL-based format>, <matrix> or <routing table><matrix>-<delay>, <expense>, <errors>, <quality of service>

The operations you can perform through this protocol are as follows:

Add a new route in the URL-based DECNET routing table.

Update an existing route in the URL-based DECNET routing table.

Delete an existing route in the URL-based DECNET routing table.

Get the full contents of the URL-based DECNET routing table.

Operations examples:

Adding a new route:

decnet://routerA:9091/Add/routerB:9091/1/ routerC:9091/5,7,100

This operation is adding a new route to the routing table on router 'routerA'. The new route specifies that to get to destination 'routerB' on port 9091, the next hop is 'routerC' on port 9091 and the route level is 1. Delay is 5, expense is 7, and quality of service is 100.

Deleting an existing route:

decnet://routerA:9091/Delete/routerB:9091

This operation is deleting route 'routerB' from the routing tables on router 'routerA'.

Updating an existing route:

decnet://routerA:9091/Add/routerB:9091/2/ routerC:9091/5,7,100

This operation is updating an existing route ('routerB') in the routing table on router 'routerA'. The update specifies that this entry is now has a level two link state.

Getting a single routing table entry:

decnet://routerA:9091/Get/routerB:9091

This operation is getting the routing table entry information for the destination 'routerB:9091'.

Getting the entire contents of a routing table:

decnet://routerA:9091

This operation gets the full contents of the routing table on router 'routerA:9091'.

URL-Based Router Table definition:

(a <router-address> is: decnet://<router-name>:<port#>)
Destination Next-Hop Level Delay Errors Expense QOS
<router-address1><router-address2>1 5 0 50 100
<router-address3><rotuer-address2>2 7 0 25 75 etc.

Accordingly, a URL-based router interface allows clients to access and participate in the DECNET protocol using the URL convention.

3. DNS COMMUNICATIONS BASED ON THE URL

Most name lookup services do not support URL addresses as the primary name-to-address association. The DNS resolutions are based upon names and their corresponding network addresses (IP addresses) as the primary association. In addition they do not support accessing the DNS data across the World Wide Web.

A URL-based DNS Protocol introduces the notion of using Universal Resource Locator to convey DNS protocol information. Each URL-based DNS server has tables of records that utilize URL-based DNS information. The DNS server uses these table entries to provide DNS information to their clients. The URL-based DNS Protocol definition is as follows:

dns[s]://<server-name>:<port#>/<operation>/<dns payload>

(when including 's' the transport is in secure mode)
<server-name>—The name of the server that implements the URL-based DNS protocol.
<port#>—The listening port number for the URL-based DNS process on the server.
<operation>—One of the following: Add, Delete, Get, GetAddress, GetName, Update
<dns payload>-<address in URL-based format>or <name-string> or <name-string>/<address in URL-based format> or <dns table>

The operations you can perform through this protocol are as follows: Add a new DNS entry in the URL-based DNS table; Update an existing entry in the URL-based DNS table; Delete an existing entry in the URL-based DNS table; Get the full contents of the URL-based DNS table.

Operations examples:

Adding a new entry:

dns://serverA:9091/Add/cisco.com/"http:// www.cisco.com"

This operation is adding a new entry to the DNS table on server 'serverA'. The new entry associates the name cisco-.com with the address http://www.cisco.com.

Deleting an existing entry:

dna://serverA:9091/Delete/cisco.com or dna://serverA:9091/Delete/"http://www.cisco.com"

This operation deletes either the cisco.com entry and associated address.

Updating an existing route:

dns://serverA:9091/Update/cisco.com/"http:// wwwin.cisco.com"

This operation is updating an existing entry for cisco.com to use the address http://wwwin.cisco.com.

Getting a DNS URL-address:

dns://serverA:9091/GetAddress/cisco.com

This operation gets the URL-based address associated with the name cisco.com from DNS server 'serverA'.

Getting a DNS name:

dns://serverA:9091/GetName/"http://www.cisco.com"

This operation gets the name associated with the URL-based address http://www.cisco.com from DNS server 'serverA'.

Getting the entire contents of the DNS table:

dns://serverA:9091

This operation gets the full contents of the DNS table on DNS server 'serverA:9091'.

URL-Based DNS Table definition:

Name URL-based Address
cisco.com http://www.cisco.com etc.

Accordingly, a URL-based DNS server interface allows clients to access DNS services using the URL convention.

4. EIGRP COMMUNICATIONS BASED ON THE URL

Many routers support an implementation of the EIGRP routing protocol. This protocol and its corresponding routing tables are based upon network addresses in the form of IP addresses. There is currently no support in this protocol to take advantage of emerging World Wide Web technology and URL-based addressing. In this embodiment, a URL-based EIGRP Protocol introduces the notion of using Universal Resource Locator to convey EIGRP protocol information. Each URL-based EIGRP protocol router has routing tables that utilize URL-based addressing. The router uses these table entries to locate both the next-hop and type of service.

The URL-based EIGRP Protocol definition is:

eigrp[s]://<router-name>:<port#>/<operation>/<eigrp payload>

(when including 's' the transport is in secure mode)
<router-name>—The name of the router that implements the URL based EIGRP.

<port#>—The listening port number for the URL-based EIGRP process on the router.

<operation>—One of the following: Add; Delete; GetNeighborTable; GetTopologyTable; Get; Update <eigrp payload>-<destination address in URL-based format>, <next hop address in URL-based format>, <internetwork delay>, <bandwidth>, <reliability>, <load> or <routing table> or <neighbor table> or <topology table>

The operations you can perform through this protocol are as follows: Add a new route in the URL-based EIGRP routing table; Update an existing route in the URL-based EIGRP routing table; Delete an existing route in the URL-based EIGRP routing table; Get the full contents of the URL-based EIGRP routing table.

Operations examples:

Adding a new route:

eigrp://routerA:9091/Add/routerB:9091/routerC:9091/100/1000/255/100

This operation is adding a new route to the routing table on router 'routerA'. The new route specifies that to get to destination 'routerB' on port 9091, the next hop is 'routerC' on port 9091 and specifies the four link attributes.

Deleting an existing route:

eigrp://routerA:9091/Delete/routerB:9091

This operation is deleting the route 'routerB' from the routing tables on router 'routerA'.

Updating an existing route:

eigrp://routerA:9091/Add/routerB:9091/routerC:9091/100/1000/150/200

This operation is updating an existing route ('routerB') in the routing table on router 'routerA'. The update specifies that the load has been updated.

Getting a single routing table entry:

eigrp://routerA:9091/Get/routerB:9091

This operation is getting the routing table entry(ies) information for the destination 'routerB:9091'.

Getting the contents of the neighbor table:

eigrp://routerA:9091/GetNeighborTable

This operation gets the full contents of the neighbor table on router 'routerA:9091'.

Getting the entire contents of a topology table:

eigrp://routerA:9091/GetTopologyTable

This operation gets the full contents of the topology table on router 'routerA:9091'.

Getting the entire contents of a routing table:

eigrp://routerA:9091

This operation gets the full contents of the routing table on router 'routerA:9091'.

URL-Based Router Table definition:

(a <router-address> is: eigrp://<router-name>:<port#>)

Destination Next-Hop InternetworkDelay Bandwidth Reliability Load

<router-add1><router-add2> 10 1000 150 100

<router-add3><rotuer-add2> 100 500 255 200 etc.

URL-Based Neighbor Table definition:

(a <router-address> is: eigrp://<router-name>:<port#>)

Neighbors

<router-add1>

<router-add3>etc.

URL-Based Topology Table definition:

(a <router-address> is: eigrp://<router-name>:<port#>)

Destination

<router-add1>

<router-add3>etc.

Accordingly, a URL-based router interface allows clients to access and participate in the EIGRP protocol using the URL convention.

5. COMMUNICATIING OSI INFORMATION BASED ON THE URL

Most routers today support an implementation of the (OSI) IDRP routing protocol. This protocol and its corresponding routing tables are based upon network addresses. There is currently no support in this protocol to take advantage of the emerging World Wide Web technology and URL-based addressing. According to an embodiment, a URL-based (OSI)IDRP Protocol introduces the notion of using Universal Resource Locator to convey (OSI)IDRP protocol information. Each URL-based (OSI)IDRP protocol router has routing tables that utilize URL-based addressing. The router uses these table entries to locate both the next-hop and destinations. The URL-based (OSI)IDRP Protocol definition is as follows:

idrp[s]://<router-name>:<port#>/<operation>/<idrp payload>

(when including 's' the transport is in secure mode)

<router-name>—The name of the router that implements the URL based (OSI)IDRP protocol.

<port#>—The listening port number for the URL-based (OSI)IDRP process on the router.

<operation>—One of the following: Add; Delete; Get; Update;

<idrp payload>-<border information system>, <routing domain identifier>, <routing information base>, <confederation> or <routing table>

The operations you can perform through this protocol are as follows: Add a new route in the URL-based (OSI)IDRP routing table; Update an existing route in the URL-based (OSI)IDRP routing table; Delete an existing route in the URL-based (OSI)IDRP routing table; Get the full contents of the URL-based (OSI)IDRP routing table.

Accordingly, a URL-based router interface allows clients to access and participate in the (OSI)IDRP protocol using the URL convention.

6. IGRP COMMUNICATIONS BASED ON THE URL

Most routers today support an implementation of the IGRP routing protocol. This protocol and its corresponding routing tables are based upon network addresses (IP addresses). There is currently no support in this protocol to take advantage of the emerging World Wide Web technology and URL-based addressing. According to an embodiment, a URL-based IGRP Protocol introduces the notion of using Universal Resource Locator to convey IGRP protocol information. Each URL-based IGRP protocol router has routing tables that utilize URL-based addressing. The router uses these table entries to locate both the next-hop and type of service. The URL-based IGRP Protocol definition is as follows:

igrp[s]://<router-name>:<port#>/<operation>/<igrp payload>

(when including 's' the transport is in secure mode)

<router-name>—The name of the router that implements the URL based IGRP.

<port#>—The listening port number for the URL-based IGRP process on the router.

<operation>—One of the following: Add; Delete; Get; Update

<igrp payload>-<destination address in URL-based format>, <next hop address in URL-based format>, <internetwork delay>, <bandwidth>, <reliability>, <load> or <routing table>

The operations you can perform through this protocol are as follows: Add a new route in the URL-based IGRP routing table; Update an existing route in the URL-based IGRP routing table; Delete an existing route in the URL-based IGRP routing table; Get the full contents of the URL-based IGRP routing table.

Operations examples:

Adding a new route:

igrp://routerA:9091/Add/routerB:9091/routerC:9091/100/1000/255/100

This operation is adding a new route to the routing table on router 'routerA'. The new route specifies that to get to destination 'routerB' on port 9091, the next hop is 'routerC' on port 9091 and specifies the four link attributes.

Deleting an existing route:

igrp://routerA:9091/Delete/routerB:9091

This operation is deleting the route 'routerB' from the routing tables on router 'routerA'.

Updating an existing route:

igrp://routerA:9091/Add/routerB:9091/routerC:9091/100/1000/150/200

This operation is updating an existing route ('routerB') in the routing table on router 'routerA'. The update specifies that the load has been updated.

Getting a single routing table entry:

igrp://routerA:9091/Get/routerB:9091

This operation is getting the routing table entry(ies) information for the destination 'routerB:9091'.

Getting the entire contents of a routing table:

igrp://routerA:9091

This operation gets the full contents of the routing table on router 'routerA:9091'.

URL-Based Router Table definition:

(a <router-address> is: igrp://<router-name>:<port#>)

Destination Next-Hop InternetworkDelay Bandwidth Reliability Load

<router-add1><router-add2> 10 1000 150 100

<router-add3><rotuer-add2> 100 500 255 200 etc.

The URL-based router interface allows clients to access and participate in the IGRP protocol using the URL convention.

7. IPX-RIP COMMUNICATION BASED ON THE URL

Most routers today support an implementation of the IPX-RIP routing protocols. This protocol and its corresponding routing tables are based upon network addresses. There is currently no support in this protocol to take advantage of the emerging World Wide Web technology and URL-based addressing. A URL-based IPX-RIP Protocol introduces the notion of using Universal Resource Locator to convey IPX-RIP protocol information.

Each URL-based IPX-RIP protocol router has routing tables that utilize URL-based addressing. The router uses these table entries to locate both the next-hop and destinations.

The URL-based IPX-RIP Protocol definition is as follows:

ipx-rip[x][s]://<router-name>:<port#>/<operation>/<ipx-rip payload>

(when including 's' the transport is in secure mode, [x] can be 1 or 2 indicating the version of ipx-rip protocol)

<router-name>—The name of the router that implements the URL based IPX-RIP protocol.

<port#>—The listening port number for the URL-based IPX-RIP process on the router.

<operation>—One of the following: Add; Delete; Get; Update.

<ipx-rip payload>–<destination address in URL-based format>, <metric>, <next hop address in URL-based format> or <routing table>

The operations you can perform through this protocol are as follows: Add a new route in the URL-based IPX-RIP routing table; Update an existing route in the URL-based IPX-RIP routing table; Delete an existing route in the URL-based IPX-RIP routing table; Get the full contents of the URL-based IPX-RIP routing table.

Operations examples:

Adding a new route:

ipx-rip1://routerA:9091/Add/routerB:9091/5/routerC:9091

This operation is adding a new route to the routing table on router 'routerA'. The new route specifies that to get to destination 'routerB' on port 9091, the next hop is 'routerC' on port 9091 at a metric cost of 5.

Deleting an existing route:

ipx-rip1://routerA:9091/Delete/routerB:9091

This operation is deleting route 'routerB' from the routing tables on router 'routerA'.

Updating an existing route:

ipx-rip1://routerA:9091/Update/routerB:9091/7/routerD:9091

This operation is updating an existing route ('routerB') in the routing table on router 'routerA'. The update specifies that to get to destination 'routerB' on port 9091, the next hop is 'routerD' on port 9091 at a metric cost of 7.

Getting a single routing table entry:

ipx-rip1://routerA:9091/Get/routerB:9091

This operation is getting the routing table entry information for the destination 'routerB:9091'.

Getting the entire contents of a routing table:

ipx-rip1://routerA:9091

This operation gets the full contents of the routing table on router 'routerA:9091'.

URL-Based Router Table definition:

(a <router-address> is: ipx-rip1://<router-name>:<port#>)

Destination Next-Hop Metric

<router-address1><router-address2>5

<router-address3><router-address2>6 etc.

Accordingly, a URL-based router interface allows clients to access and participate in the IPX-RIP protocol using the URL convention.

8. OSPF COMMUNICATION BASED ON THE URL

Most routers today support an implementation of the OSPF routing protocol. This protocol and its corresponding routing tables are based upon network addresses (IP addresses). There is currently no support in this protocol to take advantage of the emerging World Wide Web technology and URL-based addressing. A URL-based OSPF Protocol introduces the notion of using Universal Resource Locator to convey OSPF protocol information. Each URL-based OSPF protocol router has routing tables that utilize URL-based addressing. The router uses these table entries to locate both the next-hop and type of service. The URL-based OSPF Protocol definition is as follows:

ospf[s]://<router-name>:<port#>/<operation>/<ospf payload>

(when including 's' the transport is in secure mode)

<router-name>—The name of the router that implements the URL based OSPF protocol.

<port#>—The listening port number for the URL-based OSPF process on the router.

<operation>—One of the following: Add; Delete; Get; GetRouteType; GetTypeOfService; Update <ospf payload>–<destination address in URL-based format>, <type of service>, <route type>, <next hop address in URL-based format> or <routing table>

The operations you can perform through this protocol are as follows: Add a new route in the URL-based OSPF routing table; Update an existing route in the URL-based OSPF routing table; Delete an existing route in the URL-based OSPF routing table; Get the full contents of the URL-based OSPF routing table.

Operations examples:

Adding a new route:

ospf://routerA:9091/Add/routerB:9091/Urgent/Inter-area/routerC:9091

This operation is adding a new route to the routing table on router 'routerA'. The new route specifies that to get to destination 'routerB' on port 9091, the next hop is 'routerC' on port 9091 and this is an Urgent route using type Intra-area.

Deleting an existing route:

ospf://routerA:9091/Delete/routerB:9091/Normal

This operation is deleting the Normal route 'routerB' from the routing tables on router 'routerA'.

Updating an existing route:

ospf://routerA:9091/Update/routerB:9091/Normal/Inter-area/routerC:9091

This operation is updating an existing route ('routerB') in the routing table on router 'routerA'. The update specifies that the type of service is updated to Normal.

Getting a single routing table entry:

ospf://routerA:9091/Get/routerB:9091

This operation is getting the routing table entry(ies) information for the destination 'routerB:9091'.

Getting the entire contents of a routing table:

ospf://routerA:9091

This operation gets the full contents of the routing table on router 'routerA:9091'.

URL-Based Router Table definition:

(a <router-address> is: ospf://<router-name>:<port#>)

Destination Next-Hop Type Of Service Route Type

<router-address1><router-address2> Normal Intra-area

<router-address3><rotuer-address2> Urgent External etc.

Accordingly, a URL-based router interface allows clients to access and participate in the OSPF protocol using the URL convention.

9. BGP COMMUNICATIONS BASED ON THE URL

Most routers today support an implementation of the BGP routing protocol. This protocol and its corresponding routing tables are based upon network addresses (IP addresses). There is currently no support in this protocol to take advantage of the emerging World Wide Web technology and URL-based addressing. The URL-based BGP Protocol introduces the notion of using Universal Resource Locator to convey BGP protocol information. Each URL-based BGP protocol router has routing tables that utilize URL-based addressing. The router uses these table entries to locate both the next-hop and type of service. The URL-based BGP Protocol definition is as follows:

bgp[s]://<router-name>:<port#>/<operation>/<bgp payload>

(when including 's' the transport is in secure mode)

<router-name>—The name of the router that implements the URL based BGP.

<port#>—The listening port number for the URL-based BGP process on the router.

<operation>—One of the following: Add; Delete; Get; Update.

<bgp payload>–<destination address in URL-based format>, <next hop address in URL-based format>, <autonomous system count>, <type of link>, <other factors (delay, cost, etc)> or <routing table>

The operations you can perform through this protocol are as follows: Add a new route in the URL-based BGP routing table. Update an existing route in the URL-based BGP routing table. Delete an existing route in the URL-based BGP routing table. Get the full contents of the URL-based BGP routing table.

Operations examples:

Adding a new route:

bgp://routerA:9091/Add/routerB:9091/routerC:9091/5/fast/0

This operation is adding a new route to the routing table on router 'routerA'. The new route specifies that to get to destination 'routerB' on port 9091, the next hop is 'routerC' on port 9091 and specifies the three link attributes.

Deleting an existing route:

bgp://routerA:9091/Delete/routerB:9091

This operation is deleting the route 'routerB' from the routing tables on router 'routerA'.

Updating an existing route:

bgp://routerA:9091/Add/routerB:9091/routerC:9091/10/slow/0

This operation is updating an existing route ('routerB') in the routing table on router 'routerA'. The update specifies that the how count and link type have been changed.

Getting a single routing table entry:

bgp://routerA:9091/Get/routerB:9091

This operation is getting the routing table entry(ies) information for the destination 'routerB:9091'.

Getting the entire contents of a routing table:

bgp://routerA:9091

This operation gets the full contents of the routing table on router 'routerA:9091'.

URL-Based Router Table definition:

(a <router-address> is: bgp://<router-name>:<port#>)

Destination Next-Hop Autonomous system count Link Type Other Factors

<router-add1><router-add2> 10 fast 0

<router-add3><rotuer-add2> 100 fast 0 etc.

The URL-based router interface allows clients to access and participate in the BGP protocol using the URL convention.

10. RIP COMMUNICATIONS BASED ON THE URL

Most routers today support an implementation of the RIP routing protocols. This protocol and its corresponding routing tables are based upon network addresses (IP addresses). There is currently no support in this protocol to take advantage of the emerging World Wide Web technology and URL-based addressing. The URL-based RIP Protocol introduces the notion of using Universal Resource Locator to convey RIP protocol information. Each URL-based RIP protocol router has routing tables that utilize URL-based addressing. The router uses these table entries to locate both the next-hop and destinations. The URL-based RIP Protocol definition is as follows:

rip[s]://<router-name>:<port#>/<operation>/<rip payload>

(when including 's' the transport is in secure mode)

<router-name>—The name of the router that implements the URL based RIP protocol.

<port#>—The listening port number for the URL-based RIP process on the router.

\<operation\>—One of the following: Add; Delete; Get; Update.

\<rip payload\>–\<destination address in URL-based format\>, \<matrix\>, \<next hop address in URL-based format\>, \<flags\>, \<timers\> or \<routing table\>

The operations you can perform through this protocol are as follows: Add a new route in the URL-based RIP routing table; Update an existing route in the URL-based RIP routing table; Delete an existing route in the URL-based RIP routing table; Get the full contents of the URL-based RIP routing table.

Operations examples:

Adding a new route:

rip://routerA:9091/Add/routerB:9091/5/routerC:9091/0/ 5,7,50

This operation is adding a new route to the routing table on router 'routerA'. The new route specifies that to get to destination 'routerB' on port 9091, the next hop is 'routerC' on port 9091 at a matrix cost of 5. There are no flags.

Deleting an existing route:

rip://routerA:9091/Delete/routerB:9091

This operation is deleting route 'routerB' from the routing tables on router 'routerA'.

Updating an existing route:

rip://routerA:9091/Update/routerB:9091/7/routerD:9091/ 0/5,7,50

This operation is updating an existing route ('routerB') in the routing table on router 'routerA'. The update specifies that to get to destination 'routerB' on port 9091, the next hop is 'routerD' on port 9091 at a matrix cost of 7. There are no flags.

Getting a single routing table entry:

rip://routerA:9091/Get/routerB:9091

This operation is getting the routing table entry information for the destination 'routerB:9091'.

Getting the entire contents of a routing table:

rip://routerA:9091

This operation gets the full contents of the routing table on router 'routerA:9091'.

URL-Based Router Table definition:

(a \<router-address\> is: rip://\<router-name\>:\<port#\>)

Destination Next-Hop Matrix Flag Timers

\<router-address1\>\<router-address2\> 5 0 5,7,50

\<router-address3\>\<rotuer-address2\> 6 0 5,7,50 etc.

The URL-based router interface allows clients to access and participate in the RIP protocol using the URL convention.

HARDWARE OVERVIEW

Figure 6:
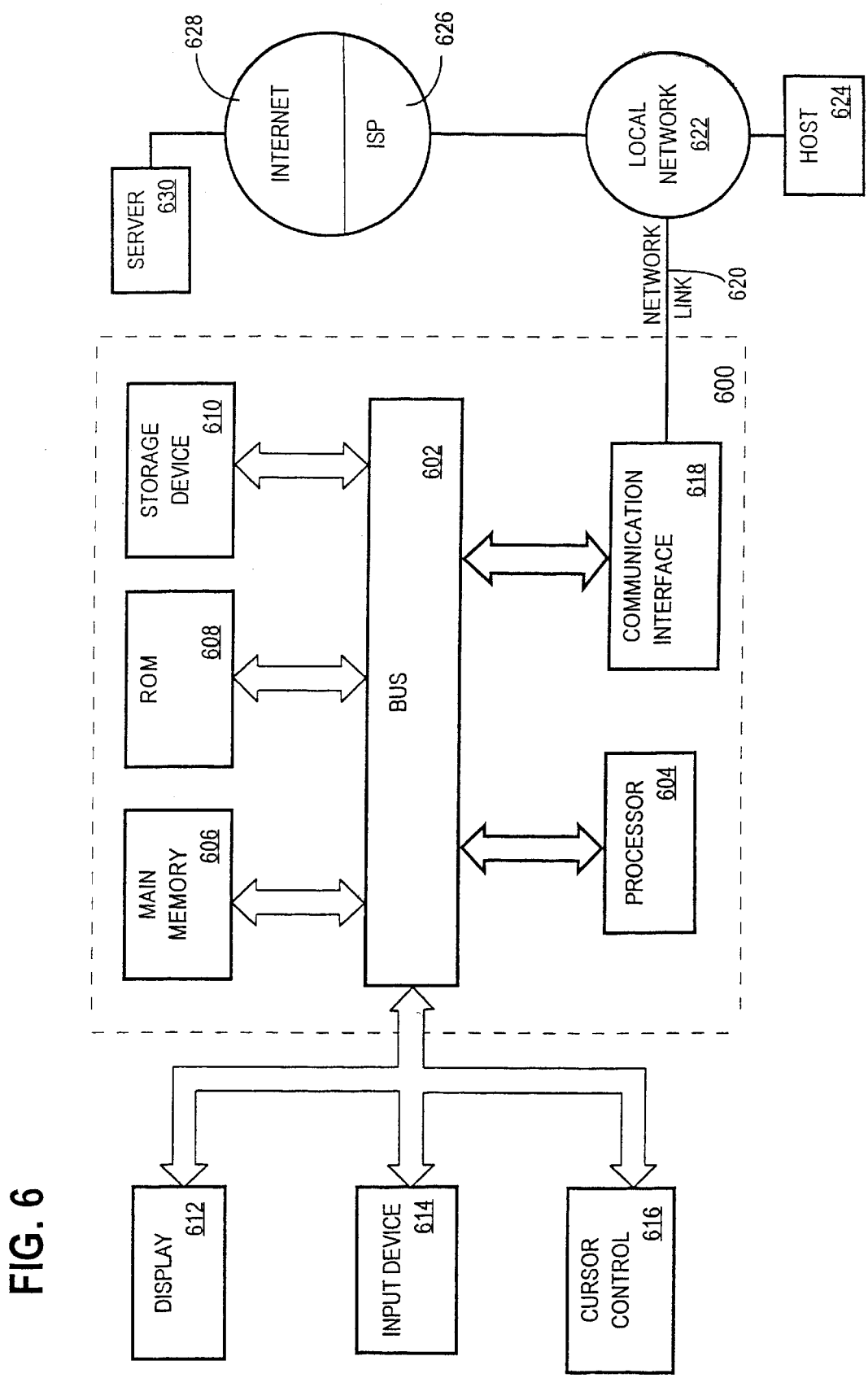
FIG. 6 is a block diagram of a computer system hardware arrangement that may be used to implement aspects of the invention.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for communicating network information among network devices using protocols based on Universal Resource Locators. According to one embodiment of the invention, communicating network information among network devices using protocols based on Universal Resource Locators is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for communicating network information among network devices using protocols based on Universal Resource Locators as described herein.

The received code may be executed by processor 604 as it is received, and/or stored in storage device 610, or other non-volatile storage for later execution. In this manner, computer system 600 may obtain application code in the form of a carrier wave.

The embodiments described in this document may be implemented using one or more software elements to provide the structures shown in block diagram form in the drawing figures. The embodiments may be implemented using independent programs or processes, plug-ins, or other software elements that interoperate with the other elements shown in the figures. Since URLs are defined for use with Internet browsers and related technologies, embodiments may be implemented using appropriate Internet technology, including Java®, JavaScript, HTML, and related technologies.

The embodiments may be implemented by registering the URL format described above with an appropriate standards body. In this manner, or without such registration, the URL formats may be processed by appropriate software or hardware elements within a network device, such as a router, switch, or gateway.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of retrieving a value of a Management Information Base (MIB) variable that is stored in a MIB of a managed device in a network, the method comprising:

creating and storing a Uniform Resource Locator (URL) that includes a Simple Network Management Protocol (SNMP) request for a value of the MIB variable;

communicating the URL to the managed device;

obtaining the SNMP request from the URL; and communicating a responsive URL, which includes the value of the MIB variable and an identifier of the MIB variable, from the managed device.

2. A method as recited in claim 1, wherein creating and storing a URL includes creating and storing the URL using a device identifier value that uniquely identifies the managed device.

3. A method as recited in claim 1, wherein creating and storing a URL includes creating and storing the URL using a port identifier value that identifies a listening port of the managed device server at which the managed device receives requests that comprise a URL containing an SNMP request.

4. A method as recited in claim 1, wherein creating and storing a URL includes creating and storing the URL using an operation value that identifies an SNMP operation to be carried out by the managed device in response to receiving the URL.

5. A method as recited in claim 1, wherein creating and storing a URL includes creating and storing the URL in the form:

snmp[s]://<server-name>:<port#>/<operation>/<snmp payload> wherein "[s]" identifies an optional parameter indicating that a secure connection is to be established, the value <server-name> identifies the managed device, the value <port#> identifies a listening port number for a URL-based SNMP process on the managed device, the value <operation> identifies an SNMP operation for the managed device to carry out, and the value <SNMP payload> comprises one or more pairs of MIB variables and values.

6. A method of processing a value of a Management Information Base (MIB) variable that is stored in a MIB of a managed device of a network, the method comprising:

executing an SNMP agent and a first URL interface software element at the managed device;

creating and storing a Uniform Resource Locator (URL) that comprises an SNMP request for the MIB variable at the managed device, the request including information identifying the MIB variable and a type of SNMP processing to be carried out;

processing the request based on the type to result in retrieving the value of the MIB variable; and communicating the value of the MIB variable to the managed device in a responsive URL.

7. A method as recited in claim 6, wherein processing the request comprises: processing the request based on the type to result in storing the value of the MIB variable in the MIB of the managed device.

8. A method as recited in claim 6, wherein creating and storing a URL includes creating and storing the URL using a device identifier value that uniquely identifies the managed device.

9. A method as recited in claim 6, wherein creating and storing a URL includes creating and storing the URL using a port identifier value that identifies a listening port of the managed device at which the managed device receives requests that comprise a URL containing a SNMP request.

10. A method as recited in claim 6, wherein creating and storing a URL includes creating and storing the URL using a n operation value that identifies a SNMP operation to be carried out by the managed device in response to receiving the URL.

11. A method as recited in claim 6, wherein creating and storing a URL includes creating and storing the URL in the form:

snmp[s]://<server-name>:<port#>/<operation>/<SNMP payload> wherein "[s]" identifies an optional parameter indicating that a secure connection is to be established, the value <server-name> identifies the managed device, the value <port#> identifies a listening port number for a URL-based SNMP process on the managed device, the value <operation> identifies an operation for the managed device to carry out, and the value <SNMP payload> comprises an SNMP request that may include one or more pairs of MIB variables and values.

12. A method as recited in claim 6, further comprising the steps of:

executing a second URL interface software element at a client logically separate from the managed device;

receiving the responsive URL and obtaining the value of the MIB variable from the responsive URL using the second URL interface software element.

13. Apparatus for retrieving SNMP information from a network, comprising:

a first URL interface executed by a client;

a second URL interface executed by a managed device in the network having a Management Information Base (MIB) comprising a plurality of stored MIB variable values; and means distributed among the first URL interface and the second URL interface for creating and storing a Uniform Resource Locator (URL) that includes an identifier of one or more of the MIB variables, retrieving a value for that variable from the managed device based on the identifier, and transporting the value from the managed device to the client.

14. An apparatus as recited in claim 13, wherein the means for creating and storing a URL includes means for creating and storing the URL using a device identifier value that uniquely identifies the managed device.

15. An apparatus as recited in claim 13, wherein the means for creating and storing a URL includes means for creating and storing the URL using a port identifier value that identifies a listening port of the managed device server at which the managed device receives requests that comprise a URL containing an SNMP request.

16. An apparatus as recited in claim 13, wherein the means for creating and storing a URL includes means for creating and storing the URL using an operation value that identifies an SNMP operation to be carried out by the managed device in response to receiving the URL.

17. An apparatus as recited in claim 13, wherein the means for creating and storing a URL includes means for creating and storing the URL in the form: snmp[s]://<server-name>:<port#>/<operation>/<snmp payload>, wherein "[s]" identifies an optional parameter indicating that a secure connection is to be established, the value <servername> identifies the managed device, the value <port#> identifies a listening port number for a URL-based SNMP process on the managed device, the value <operation> identifies an SNMP operation for the managed device to carry out, and the value <SNMP payload> comprises one or more pairs of MIB variables and values.

18. A computer-readable medium carrying one or more sequences of instructions for retrieving a value of a Management Information Base (MIB) variable that is stored in a MIB of a managed device in a network, wherein execution of the one or more sequences of instructions by one or more processors causes the one or more processors to perform the steps of:

creating and storing a Uniform Resource Locator (URL) that includes a Simple Network Managemen Protocol (SNMP) request for a value of the MIB variable;

communicating the URL To the managed device;

obtaining the SNMP request from the URL; and communicating a responsive URL, which includes the value of the MIB variable and an identifie of the MIB variable, from the managed device.

19. A computer-readable medium carrying one or more sequences of instructions for retrieving a value of a Management Information Base (MIB) variable that is stored in a MIB of a managed device in a network, wherein execution of the one or more sequences instructions by one or more processors causes the one or more processors to perform the steps of:

executing an SNMP agent and a first URL interface software element at the managed device;

creating and storing a Uniform Resource Locator (URL) that comprises an SNMP request for the MIB variable at the managed device, the request including information identifying the MIB variable and a type of SNMP processing to be carried out;

processing the request based on the type to result in retrieving the value of the MIB variable; and communicating the value of the MIB variable to the managed device in a responsive URL.

* * * * *

UNITED STATES PATENT AND TRADEMARK OFFICE
CERTIFICATE OF CORRECTION

PATENT NO.    : 6,529,894 B1
DATED         : March 4, 2003
INVENTOR(S)   : Haeri et al.

It is certified that error appears in the above-identified patent and that said Letters Patent is hereby corrected as shown below:

Column 25,
Line 12, "a n" should read -- an --;

Column 26,
Line 15, "<servername>" should read -- <server-name> --;
Line 30, "Managemen" should read -- Management --;
Line 32, "To" should read -- to --;
Line 35, "identifie" should read -- identifier --.

Signed and Sealed this

Second Day of December, 2003

JAMES E. ROGAN
*Director of the United States Patent and Trademark Office*